United States Patent [19]

Nelson

[11] Patent Number: 5,444,917
[45] Date of Patent: Aug. 29, 1995

[54] SENSING DEVICE

[76] Inventor: Donald F. Nelson, 305 - 4311 - 73rd Street N.W., Calgary, Alberta, Canada, T3B 2M2

[21] Appl. No.: 148,458
[22] Filed: Nov. 8, 1993
[51] Int. Cl.⁶ .............................................. G01C 9/06
[52] U.S. Cl. .......................................... 33/366; 33/395
[58] Field of Search ................ 33/366, 389, 390, 391, 33/395

[56] References Cited

U.S. PATENT DOCUMENTS

| | | | |
|---|---|---|---|
| 1,626,567 | 4/1927 | Steinbrecht | 33/366 |
| 2,338,811 | 1/1944 | Hasbrook | 33/366 |
| 3,164,023 | 1/1965 | Holderer | 33/366 |
| 3,921,128 | 11/1975 | Snead | 180/282 |
| 4,182,046 | 1/1980 | Ludlow et al. | 33/366 |
| 4,486,844 | 12/1984 | Brunson et al. | 364/559 |
| 4,493,155 | 1/1985 | Comeau et al. | 33/366 |
| 4,503,622 | 3/1985 | Swartz et al. | 33/366 |
| 4,567,666 | 2/1986 | Neis et al. | 33/366 |
| 4,603,484 | 8/1986 | Strothmann | 33/366 |
| 4,707,927 | 11/1987 | Hiyama | 33/366 |
| 4,716,534 | 12/1987 | Baucom et al. | 364/559 |
| 4,760,649 | 8/1988 | Preston et al. | 33/333 |
| 4,912,854 | 4/1990 | Weadon | 33/348.2 |
| 4,932,132 | 6/1990 | Baker et al. | 33/366 |
| 5,031,329 | 7/1991 | Smallidge | 33/366 |
| 5,136,784 | 8/1992 | Marantz | 33/366 |

Primary Examiner—Christopher W. Fulton

[57] ABSTRACT

A sensing device. The sensing device comprises a body containing a arcuate tube. A first conductor in the tube is able to move along the tube. There is a plurality of spaced contacts within the tube and conductors extending from the spaced contacts. There is a remote readout to receive the information from the conductors to indicate the position of the first conductor in the tube and thus the inclination of the tube.

10 Claims, 4 Drawing Sheets

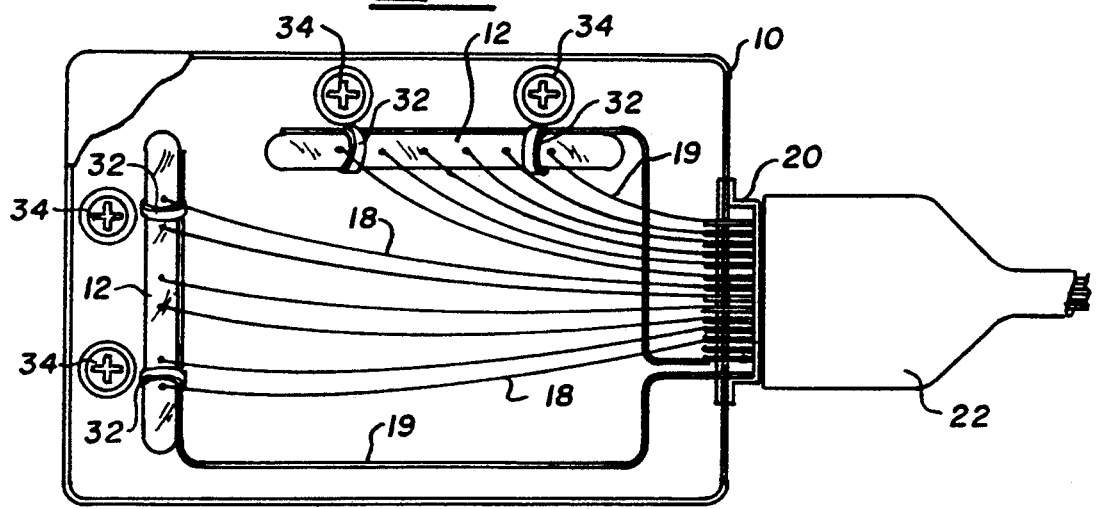
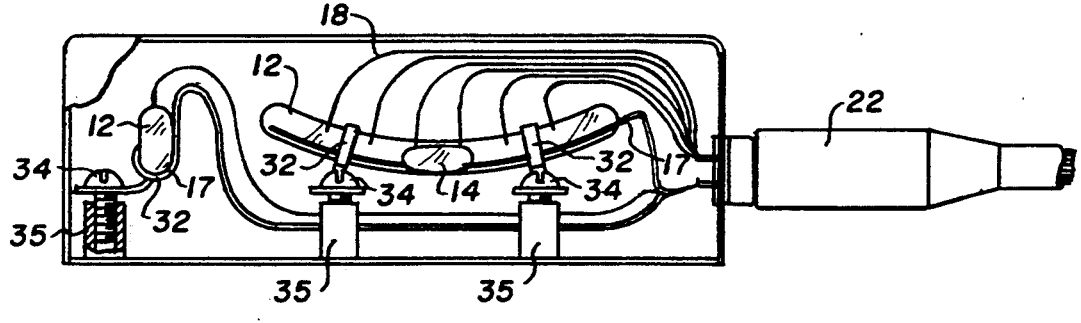
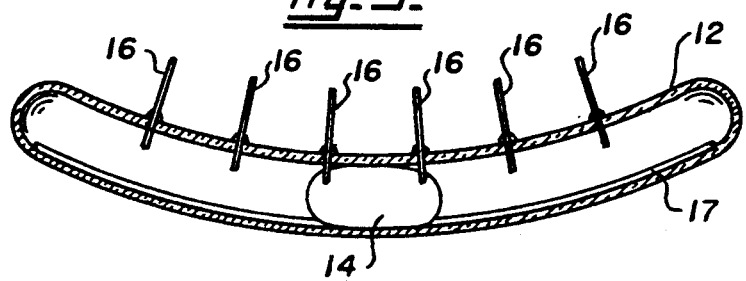

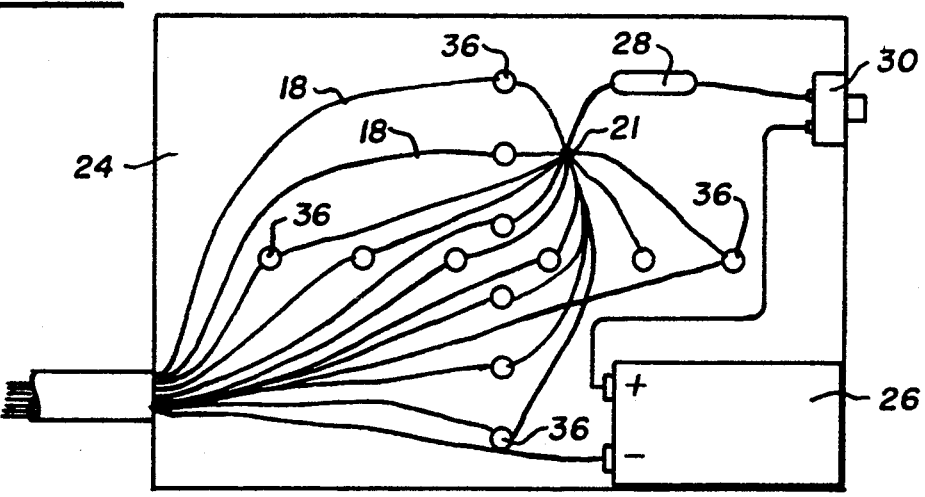
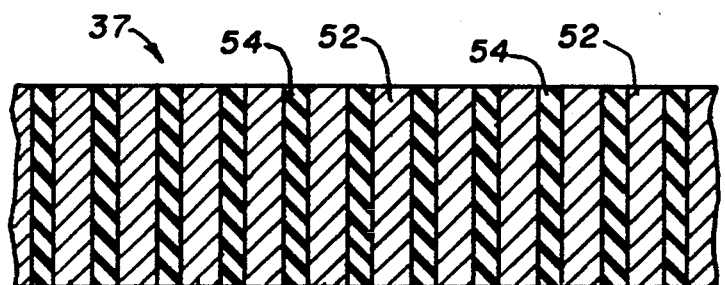
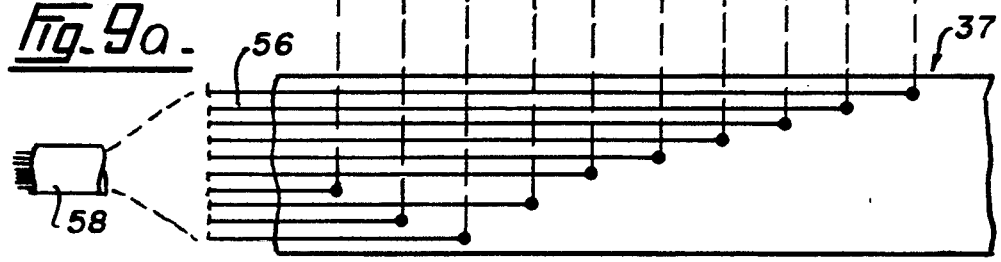
 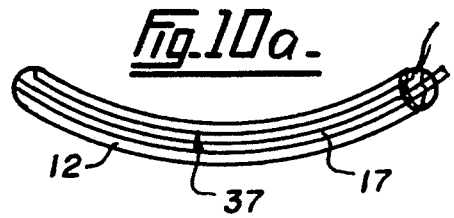
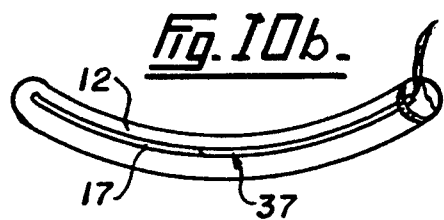

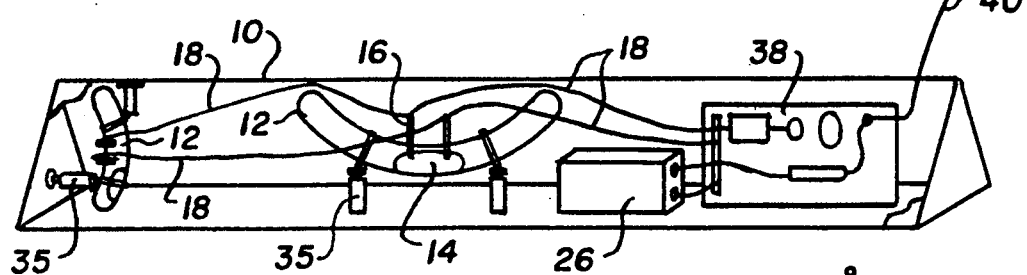
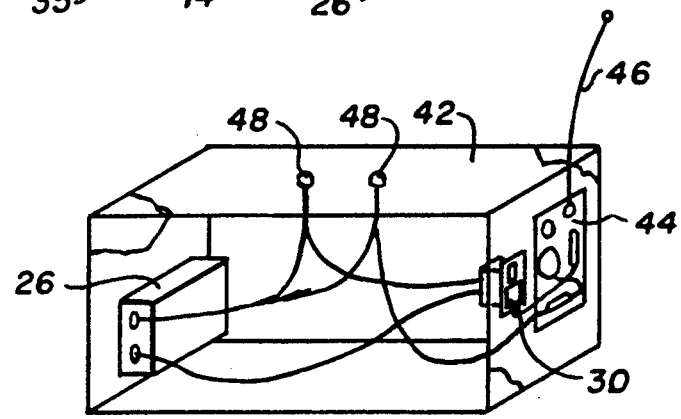
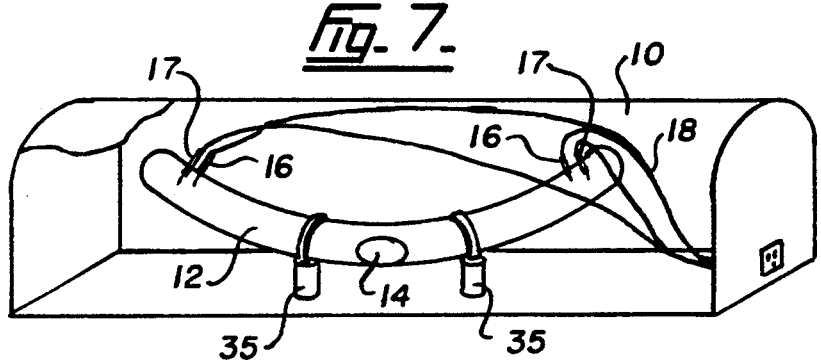
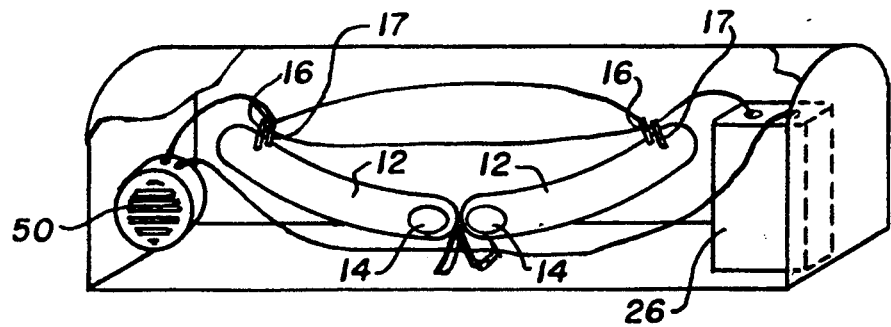

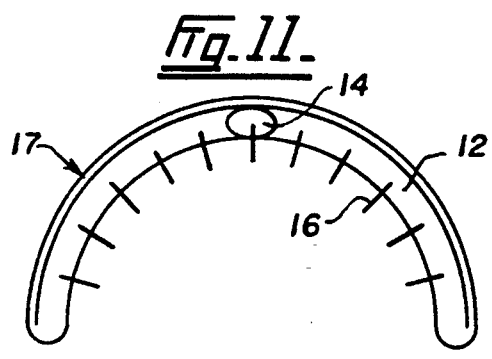
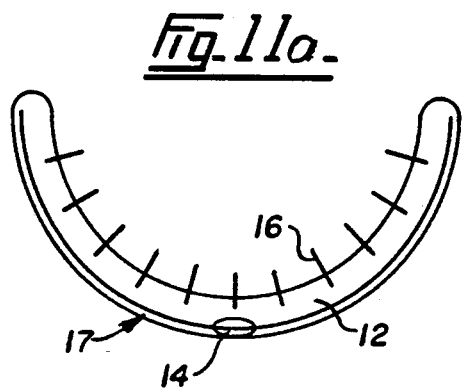
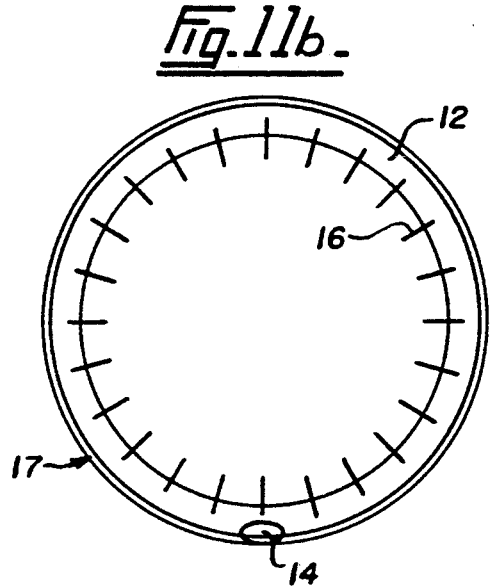
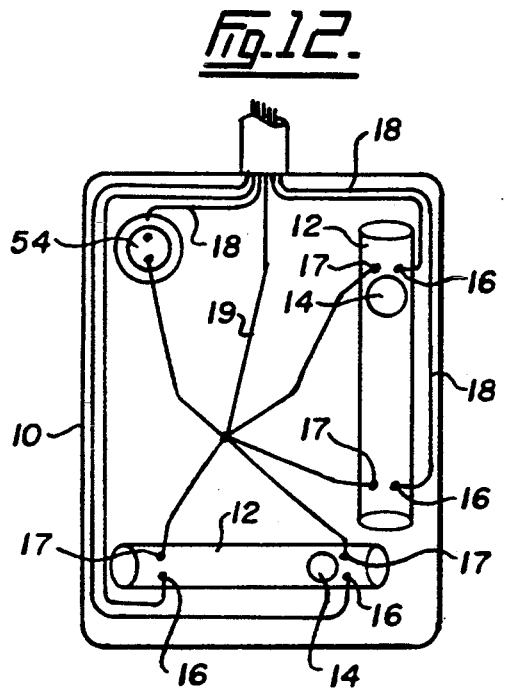
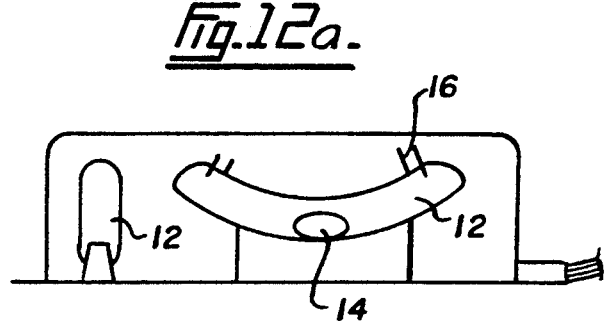

5,444,917

SENSING DEVICE

FIELD OF THE INVENTION

This invention relates to a sensing device. The invention finds particular application as a remote level.

DESCRIPTION OF THE PRIOR ART

Traditionally a level, for example in construction, has been determined by the use of a spirit level. Such a level includes a glass tube filled with a coloured liquid having a bubble in it. There is a flat surface. The arrangement is such that if the flat surface is placed against a surface that is level, then the bubble aligns with a calibrated mark on the level. These spirit levels are useful in determining either true vertical or true horizontal.

These levels are perfectly acceptable and widely used. However, there are circumstances where a remote sensing of level is desirable and, clearly, a conventional spirit level is not suitable in those circumstances as an observation of the bubble must be made.

Remote observation is desirable where, for example, there is a toxic environment, where it is dark, or, perhaps more usually, where the level can be adjusted, for example by use of a hydraulic jack but the position of adjustment is remote from the surface being levelled. Such an arrangement can be where, for example, a trailer is being levelled from the cab of a vehicle.

There are a number of electrical and mechanical devices useful in determining levels that are more sophisticated then the bubble spirit level. Examples of these level include those described and claimed in U.S. Pat. Nos. 4,912,854 to Weadon; 5,031,329 to Smallidge; 4,716,534 to Baucom; 4,760,646 to Preston; 4,486,844 to Brunson and 4,503,622 to Swartz.

Of the above patents Weadon discloses an apparatus for facilitating the reading of a conventional level, that is a level using a bubble. Weadon uses a viewing chamber. Smallidge uses bladders and sensors differing electrical resistance.

Baucom uses a micro-processor and a photo-detector. Preston uses a pendulum and is particularly useful in the levelling of a travel trailer. Brunson is a sophisticated, expensive piece of equipment using a dual axis sensor element. Swartz uses a sensor and reads a differential signal that is developed across contacts. The amplitude and phase of these signals are determined by the tilt angle.

The above devices vary between the very simple and the very complex. But it is felt that there is still a need for an electrically operated sensor to determine a level, particularly useful in determining a level remotely and at night, that is robust and simple. Excessive sophistication is not required in this field.

SUMMARY OF THE INVENTION

Accordingly the present invention provides a sensing device comprising a body containing an arcuate tube; a conductor in the tube able to move along the tube; a plurality of spaced contacts within the tube; conductors extending from said spaced contacts; a remote read-out to receive information from said conductors to indicate the position of the liquid in the tube and thus the inclination of the tube.

The conductor may be a liquid, preferably mercury. However, in some circumstances, a conducting ball or sphere may be used.

DESCRIPTION OF THE DRAWINGS

The invention is illustrated, merely by way of example, in the drawings, in which:

FIG. 1 is a plan view, partially in section, of a sensing device according to the present invention;

FIG. 2 is a side elevation of the sensing device of FIG. 1;

FIG. 3 is a detail of the device of FIGS. 1 and 2;

FIG. 4 illustrates a remote read-out useful, for example, with the sensing device of FIG. 1;

FIG. 5 illustrates a level according to a further aspect of the present invention;

FIG. 6 illustrates a read-out useful with the sensing device of FIG. 5;

FIG. 7 illustrates a further embodiment of the invention;

FIG. 8 illustrates a variation of FIG. 7;

FIG. 9 illustrates an alternative contact system for the sensing device of the present invention;

FIG. 9A is a rear view of the contact system of FIG. 9;

FIGS. 10, 10A and 10B illustrate locations for the contacts of FIGS. 9 and 9A;

FIGS. 11, 11A and 11B illustrate a variation of the invention; and

FIGS. 12 and 12A illustrate yet a further embodiment of the invention.

DESCRIPTION OF THE PREFERRED EMBODIMENTS

FIGS. 1 to 3 show a sensing device comprising a body 10 containing an arcuate tube 12. As shown 1 particularly in FIGS. 2 and 3, there is a conducting liquid 14 in the tube 12. Mercury is preferred. FIG. in particular shows the use of two arcuate tubes 12 so that the sensing device can be used to determine level in two planes.

As shown particularly in FIG. 3, there is a plurality of spaced contacts 16 within the tube. Conductors 18 extend from the spaced contacts 16 as shown most clearly in FIGS. 1 and 2. In the embodiment of FIGS. 1 to 3 the spaced contacts 16 are probes extending through the tube 12 and FIG. 1 shows that the wires extend to a socket 20, for example a 15-pronged socket, mounted in the body 10. A lead 22 extends from the socket 20 to a remote read-out, for example the remote read-out 24 as shown in FIG. 4. In the remote read-out 24 there is a battery 26, typically a nine volt battery, and a resistor 28. The resistor 28 is in series with the wiring 18 and with a switch 30.

As shown in FIG. 1 to 3, there is a contact strip 17 in the tube 12, opposed to probes 16. The probes 16 and strips 17 may each be in contact with the negative pole of battery 26. Strip 17 is in contact through wires 19. The circuit is completed through resistor 28 in series with switch 30. Wires 18 lead to a common meeting point 21, prior to resistor 28.

FIG. 1 also shows the use of a levelling system comprising brackets 32 attached to each tube 12 and mounted on screws 34 received in housings 35. Thus minor adjustments to the level can be made by rotating the screws 34 to move the bracket 32 up and down to make minor adjustments in the calibration of the level.

There are series of light emitting diodes 36 (LED) mounted in the remote read-out 24. The LEDs 36 are arranged in a cross, as shown particularly in FIG. 4 and level is achieved by lighting four LEDs at the middle of the read-out, indicating level in two planes.

Thus to use the level of FIGS. 1 to 4, the body 10 containing the arcuate tubes 12 is placed on the surface to be assessed. Depending on the length of the lead 22, the remote read-out 24 may be positioned wherever it is desired to be read. This can be at a substantial distance from the body 10. The switch 30 is switched on to operate the device and the level of the surface receiving the body assessed. It should be noted that out of true can also be assessed by viewing the LEDs that are illuminated. If necessary remote levelling can be carried out, for example by the use of a hydraulic or pneumatic circuit.

FIGS. 5 and 6 illustrate an embodiment in which the tubes are mounted in a generally triangular body although the shape of the body is immaterial. Other components in FIG. 5 are as in previous drawings and the same reference numerals are used as in those previous drawings. Instead of contact strip 17, individual contact probes 17 are used in conjunction with each probe 16. There is a on/off transmitter 38 having an antenna 40. A receiver 42 is shown in FIG 6. It includes a signal receiver 44 with antenna 46. Again it includes a 9 volt battery 24 and a switch 30. This device is operated precisely as the embodiment of FIGS. 1 to 4 except that the lead 22 is superfluous. A signal is transmitted from the antenna 40 and is received by the antenna 46 of the remote read-out 42. By known means LEDs 48 are illuminated when level is achieved. The two sets of probes 16 are joined. Movement of the first conductor 14 will automatically eliminate one set of probes 16.

FIGS. 7 shows an embodiment that can be used as an angle indicator. FIG. 7 again has a body 10 containing a tube 12. There is a plurality of contacts 16, as in FIG. 1, but, unlike FIG. 1, the contacts 16 are relatively far apart and each contact 16 has an associated contact probe 17. The arrangement is such that the embodiment of FIG. 7 can determine when an inclination reaches, for example, a certain critical angle. At that stage an alarm can be sounded or a light flashed to warn the user that the angle has been reached. Any appropriate type of alarm may be used.

The embodiment of FIG. 7 is particularly useful in, for example, trucks, where shifting of the load can be determined. It is also useful in farm tractors, trains and the like to determine excessive lean or sway.

FIG. 8 shows the use of two independent tubes 12. Again the contacts 16 are widely spaced and again the intention is to be able to determine when a certain lean is reached. A buzzer 50 is shown as an alarm.

The embodiment of FIGS. 7 and 8 can be modified to incorporate a cut-out. Further probes 16 are put in tube 12. The arrangement is such that with a first inclination an alarm sounds but with a second, greater inclination the motor of a farm tractor or the like is switched off automatically.

FIGS. 9 through 10B illustrate the use of strips 52 of electrically conducting material, mounted on a non-conducting backing 54, for example plastic, to form a probe strip 37. The strips 52 are provided with leads 56 as shown particularly in FIG. 9A which extend to a cable 58. Apart from this the use is as shown in FIG. 1. Probe strip 37 is used in place of individual contact probes 16 and each strip 52 is equivalent to a probe 16.

FIGS. 10, 10A and 10B illustrate the application of the probe strip 37 to an arcuate tube, either on the bottom of the tube as shown in FIG. 10, the top as shown in 10A or on the side as shown in 10B. In each case contact strip 17 is also used in conjunction with probe strip 37.

Although the illustrated embodiments show two arcuate tubes 12 mounted within the body 10 it is possible to use a single tube 12 to use the body in association with a straight edge able to move to two positions, at right angles to each other. Thus when the flat surface contacts the base of the body the device is useful in assessing the horizontal level. When the flat surface is rotated through 90°, that is in contact with an end of the body, then the device is useful in assessing a vertical surface. Of course the position of the body and the arcuate tube within the body, is not altered.

FIGS. 11 and 11A show a semi-circular sensor again comprising a tube 12 with probes 16 and contact strip 17. The two tubes are used in combination. An upright sensor, shown in FIG. 11, gives 180° of angle before the reverse sensor, shown in FIG. 11A, comes into effect.

FIG. 11B shows a full circle sensor that will give 360° of angle. In FIGS. 11, 11A and 11B only the details of the tubes 12 are shown. The additional structure of conducting wires 18 and the like are not shown for purposes of clarity.

FIGS. 12 and 12A illustrate a device that can be used as a joy-stick or mouse. However, in the case of the mouse it is not necessary to roll the mouse but merely to tip it. Similarly, a joy-stick does not include the actual stick, which must be moved, but can be operated simply by tilting the body. In the embodiment of FIGS. 12 and 12A the body 10 is held in the hand and simply tipped. As the body is tipped the conductor within the tube 12 moves to make the contacts. There are two tubes 12, each at right angles to each other as shown particularly in FIG. 12. FIG. 12 also shows the conventional trigger button 54 that is pressed to signal computer software that an action is to be performed. For example it may be used to operate as a trigger in games that involve shooting.

The present invention thus provides a simple device. It has the advantages of remote sensing of level coupled with great simplicity. It measures simple electrical contact. It is directional and can be used in the dark.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A sensing device comprising:
   a body containing an arcuate tube;
   a first conductor in the tube able to move along the tube;
   a plurality of spaced contacts within the tube, said contacts comprising electrically conducting strips of material mounted on a non-conducting base, said base being adhered to the arcuate tube, neighbouring conducting strips being spaced apart by an area of said non-conducting base;
   conductors extending from said conducting strips;
   a remote read-out to receive information from said conducting strips to indicate the position of the first conductor in the tube and thus the inclination of the tube.

2. A sensing device as claimed in claim 1 in which the first conductor is mercury.

3. A sensing device as claimed in claim 1 in which wires extend from the conducting strips to a socket mounted in the body.

4. A sensing device as claimed in claim 3 including a lead extending from said socket to said remote read-out.

5. A sensing device as claimed in claim 1 in which wires extend from the conducting strips to a radio transmitter able to send a first, signal indicating the position of the first conductor in the tube;
   said remote read-out being a receiver able to generate a second signal upon receipt of said first signal, the second signal indicating the angle of the tube.

6. A sensing device as claimed in claim 1 in which the conducting strips are relatively closely spaced to allow determination of small inclinations of the tube.

7. A sensing device as claimed in claim 1 in which the conducting strips are relatively widely spaced in the tube to allow determination of an inclination of the tube exceeding a predetermined angle.

8. A sensing device as claimed in claim 7 in which the device includes an alarm to indicate exceeding of the predetermined angle.

9. A sensing device as claimed in claim 1 including means to set the position of the arcuate tube within the body.

10. A sensing device comprising:
   a body containing an arcuate tube;
   a first conductor in the tube able to move along the tube;
   a plurality of spaced contacts within the tube, said contacts being probes extending through said tube;
   conductors extending from said spaced contacts, said conductors extending from the probes to a radio transmitter able to send a first signal indicating the position of the first conductor in the tube;
   a remote read-out to receive information from said conductors to indicate the position of the first conductor in the tube and thus the inclination of the tube, said remote read-out being a received able to generate a second signal upon receipt of said first signal, the second signal indicating the angle of the tube.

* * * * *